United States Patent [19]

Johns

[11] Patent Number: 4,858,327

[45] Date of Patent: Aug. 22, 1989

[54] APPARATUS FOR DETERMINING AN EDGE PROFILE OF A METALLIC WORKPIECE

[75] Inventor: Robert H. Johns, Natrona Heights, Pa.

[73] Assignee: Allegheny Ludlum Corporation, Pittsburgh, Pa.

[21] Appl. No.: 123,637

[22] Filed: Nov. 23, 1987

[51] Int. Cl.⁴ .............................................. B43L 13/02
[52] U.S. Cl. ....................................................... 33/42
[58] Field of Search ................. 33/23.02, 23.01, 23.03, 33/42, 551, 554

[56] References Cited

U.S. PATENT DOCUMENTS

| | | | |
|---|---|---|---|
| 363,657 | 5/1887 | Mackenzie | 33/23.01 |
| 935,728 | 10/1909 | Arp et al. | 33/23.01 |
| 1,904,623 | 4/1933 | Malcolm | 33/23.01 |
| 2,581,534 | 1/1952 | Hungerford | 33/41.5 |
| 3,192,628 | 7/1965 | Wroble et al. | 33/554 X |

Primary Examiner—Harry N. Haroian
Attorney, Agent, or Firm—Patrick J. Viccaro

[57] ABSTRACT

A portable apparatus for determining an edge profile of a metallic workpiece, such as a steel slab. An end portion of a tracking rod engages with an edge surface of the workpiece, and is translated along a vertical cross section of the edge surface. Variations of the surface of the edge of the workpiece causes deflection of the tracking rod. A pen mounted to the tracking rod is positioned proximate to a chart recorder thereby allowing the deflection of the tracking rod to be recorded as the tracking rod is translated, to thereby record the edge profile of the workpiece.

10 Claims, 1 Drawing Sheet

APPARATUS FOR DETERMINING AN EDGE PROFILE OF A METALLIC WORKPIECE

BACKGROUND OF THE INVENTION

1. Field of the Invention

The present invention relates generally to recording apparatus and, more particularly, to apparatus for determining and recording an edge profile of a metallic workpiece, such as a continuous cast slab.

2. Description of the Prior Art

In order to evaluate the performance of a continuous casting process in which a metal slab is formed, the flatness of the edge surfaces of the slab is frequently determined. When the edge surfaces of the slab are uniform and flat, subsequent processing of the slab to flatten the edge surfaces is not required.

One means of determining these edge surfaces includes the use of an apparatus which does not directly contact with the slab. Such apparatus utilize devices such as lasers, ultrasonic devices, and eddy current devices to determine edge profiles of the metal slabs. Signals generated by these devices are thereafter utilized to record the edge profiles of the slab. Such devices are expensive, at times unreliable, and frequently require the use of skilled personnel.

Direct contact apparatus which are more amenable for use in a mill environment are therefore frequently preferred.

One existing direct contact apparatus utilized to determine the edge profile of a metal slab is comprised of a plurality of spaced apart pin units. When forced against a vertical cross section of an edge of a slab, displacement of individual pins results, thereby creating a physical replica of the slab edge profile. This replica of the slab edge profile is then traced onto a sheet of paper to produce a recording of the edge profile. Several disadvantages are, however, also inherent in this direct contact apparatus. The device is cumbersome to use, subject to mechanical breakdowns, and, because of the requirement that the physical replica of the slab edge profile be retraced in order to record the edge profile, the resultant record of the edge profile is of only marginal accuracy and precision.

It is therefore the object of the present invention to provide an apparatus for determining the edge profile of a metallic workpiece, such a steel slab.

It is a further object of the present invention to provide a direct contact type apparatus for determining and recording the edge profile of a metallic workpiece which overcomes the failings of the prior art.

SUMMARY OF THE PRESENT INVENTION

In accordance with the present invention, an apparatus for recording an edge profile of a metallic workpiece is disclosed. The apparatus is comprised of a side engaging means for engaging with an edge surface of the workpiece. The side engaging means, may, for example, be comprised of a tracking rod having an end portion positioned proximate to the workpiece and extending in a direction transverse to the edge of the workpiece. The tracking rod preferably further includes a tracking roll positioned at an end portion of the tracking rod for contacting and engaging with the edge of a workpiece. In the preferred embodiment, the tracking rod still further includes a spring means positioned about a portion of the length of the tracking rod for exerting a spring force to maintain the tracking roll proximate to the edge of the workpiece.

The apparatus further includes a vertical translating means for translating the side engaging means across a vertical cross section of an edge surface of the workpiece. The vertical translating means may, for example, be comprised of a vertical slide bushing and a vertical slide rod slidably engaging therewith, with the side engaging means being attached to the vertical slide bushing for allowing vertical translation of the side engaging means along the length of the vertical slide rod.

A recording means records the deflection of the side engaging means as the side engaging means is translated across the vertical cross section of the edge surface, thereby recording the edge profile of the workpiece. The recording means may, for example, be comprised of an ink dispensing means and a chart means with the ink dispensing means being connected to the side engaging means and also proximate to the chart means to allow the deflection of the tracking rod to be recorded on the chart means.

In one embodiment of the present invention, the apparatus may be utilized for recording an edge profile of a metal slab, and may be comprised of a tracking rod having an end portion positioned proximate to the metal slab and extending in a direction transverse to the edge of the slab. A tracking rod bushing is mounted upon a support plate and is slidably engaged with the tracking rod to allow horizontal translation of the tracking rod. A spring means is positioned about a portion of the length of the tracking rod and exerts a spring force to maintain the end portion of the tracking rod proximate to the edge of the workpiece. A vertical slide rod slidably engages with a vertical slide bushing which is fixedly attached to the tracking rod support plate, thereby allowing vertical translation of the tracking rod support plate and the tracking rod engaged therewith along the vertical slide rod. A support means supports the vertical slide rod and a handle extends from the support means to allow an operator to hold the apparatus. A positioning bar, and an edge index protruding therefrom, extends from the support means in a direction parallel to the lengthwise direction of the tracking rod to allow positioning of the apparatus on the surface of the slab. An ink dispensing means is positioned at a second end portion of the tracking rod, and a chart means is positioned beneath the ink dispensing means to allow recording of the deflection of the tracking rod during translation thereof along the vertical cross section of the edge of the slab, thereby creating an edge profile of the slab.

BRIEF DESCRIPTION OF THE DRAWINGS

The invention may be better understood when considered in view of the accompanying drawings in which.

DESCRIPTION OF THE PREFERRED EMBODIMENT

Figure 1:
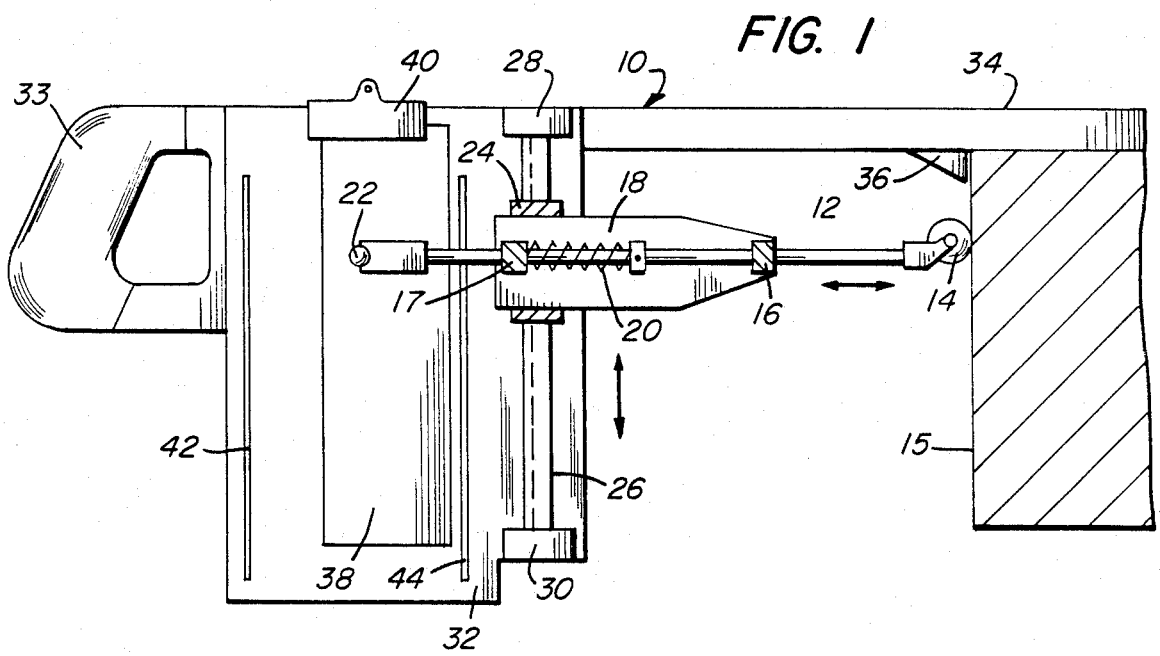
FIG. 1 is a side, elevational view of the apparatus of the present invention.

Referring now to FIG. 1, there is illustrated the edge profile recording apparatus 10 of the present invention. A tracking rod 12 containing a tracking roll 14 positioned at a first end portion thereof engages with an edge surface 15 of a workpiece. Tracking rod 12 extends in a direction transverse to edge 15 of the workpiece, and slidably engages with tracking rod bushings 16 and 17. Tracking rod bushings 16 and 17 are mounted upon tracking rod support plate 18. Spring 20 surrounds a portion of the length of tracking rod 14, and is fixedly attached at one end thereof to tracking rod bushing 17, and at the other end thereof to the tracking rod 12. Spring 20 exerts a spring force to maintain tracking roll 14 proximate to edge 15 of a metal workpiece. Positioned near a second end of tracking rod 12 is a recording means, such as pen 22. Bushings 16 and 17 allow tracking rod 12 limited translation in the horizontal direction.

Mounted beneath support plate 18 is vertical slide bushing 24. Vertical slide bushing 24 slidably engages with vertical slide rail 26 to allow slide bushing 24, and tracking rod support plate 18 positioned thereabove, to slide along the length of slide rail 26. Positioned at the opposite ends of slide rail 26 are stoppers 28 and 30. Stoppers 28 and 30 are mounted upon support plate 32. Extending from one end of support plate 32 is handle 33 to allow an operator to hold the apparatus 10. Extending from an opposite end of support plate 32 is positioning bar 34. Positioning bar 34 extends in a direction parallel to the lengthwise direction of tracking rod 12, and contains an edge index 36 which extends from the positioning bar 34. Positioning bar 34 functions to position the apparatus 10 at a known relationship relative to the workpiece to allow determination of the edge profile of the workpiece. Removably attached to the support plate 32 is recording tablet 38. The recording tablet 38 may be attached to the support plate 32 by clip 40 and aligned by page alignment strips 42 and 44.

Figure 2:
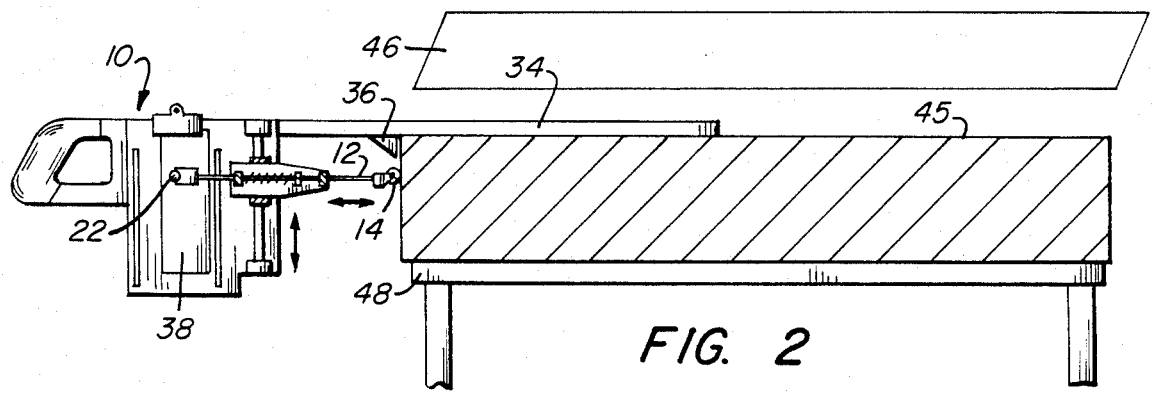
FIG. 2 is a side, elevational view of the apparatus of the present invention positioned proximate to a metal slab to allow determination of the edge profile of the slab.

The apparatus 10 of the present invention allows an edge profile of a workpiece, such as a steel slab, to be recorded. Referring now to the illustration of FIG. 2, apparatus 10 is positioned proximate to a steel slab 45 cast by a continuous caster 46, here shown in block form. Slab 45 is illustrated as being positioned on a caster runoff table 48. It is to be understood, however, that apparatus 10 may similarly be utilized to record edge profiles of other workpieces at other locations.

Figure 3:
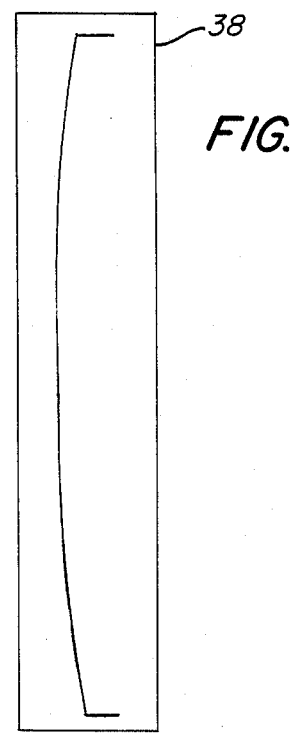
FIG. 3 is a typical edge profile created by operation of the present invention.

An operator first positions the apparatus 10 such that the positioning bar 34 is above the slab 45, and the edge index 36 of positioning bar 34 contacts with a corner of the slab 45. Once positioned, the edge profile of the slab 45 may be determined. By manually translating tracking rod support plate 18 along vertical slide rail 26, the edge profile of the slab 45 is recorded on recording tablet 38. The force exerted by spring 20 ensures that tracking roll 14 of the tracking rod 12 maintains contact with the edge of the slab 45 during vertical translation of the rod 12 along slide rail 26. Surface variations of the edge of the slab 45 cause the tracking rod 12 to deflect, i.e. translate, in the horizontal direction. Because the pen 22 is mounted on the rod 12, deflection of the tracking rod 12 also causes deflection of the ink dispensing means 22. Such deflection of the pen 22 is recorded on the recording tablet 38. A typical profile recorded on the recording tablet 48, recorded by operation of the measuring apparatus 10 of the present invention, is illustrated in FIG. 3. Edge profiles of other portions of the slab 45, or other such slabs, may be similarly recorded.

While the present invention has been described in connection with the preferred embodiment of the various figures, it is to be understood that other similar embodiments may be used or modifications or additions may be made to the described embodiment for performing the same functions of the present invention without deviating therefrom. Therefore, the present invention should not be limited to any single embodiment, but rather construed in breadth and scope in accordance with the recitation of the appended claims.

What I claim is:

1. A portable apparatus for determining the surface profile of a vertical side of a large rectilinear shaped metallic slab while in an unconnected relationship therewith, the apparatus including:

means for stationarily supporting the slab in a horizontal position and at an elevational position easily approachable by a single work person handling the apparatus during the determining operation, the portable characteristic of the apparatus being obtained by a positioning bar means arranged on the end of the apparatus most adjacent to the slab when in its operating position, said bar means adapted to be positioned in an overhanging supporting relation with respect to the surface of the upper side of the slab, the lower portion of said positioning bar means being established by a positioning bar projection therefrom to engage with the vertical side of the slab, said bar means having a said overhanging length, a strength and a rigidity so as to give stability to the opposite free end of the apparatus when in its operative position, and allowing a substantial reduction in the remaining required supporting weight for the apparatus when said bar means is in its operative position supported by the slab, said portable characteristic also being a result of a gripping part formed and positioned to be easily gripped by the work person, the apparatus further including a frame means having a part for carrying said gripping part, said frame means arranged generally between said bar means and said gripping part and wherein said frame means is constructed to operatively carry the following:

a. surface engaging means for engaging with the vertical side of the slab and carried indirectly by said frame means so as to be moveable relative to said bar means, b. vertical translating means operatively connected to said surface engaging means for allowing translation of the surface engaging means across the vertical side of the slab, c. means being a part of said surface engaging means for allowing the work person to manually move said surface engaging means to effect said translation movement, and d. recording means operatively connected to said surface engaging means for recording deflection of said surface engaging means as the surface engaging means is translated across the vertical side of the slab, thereby recording the surface profile of the vertical side of the slab.

2. A portable apparatus of claim 1 wherein said positioning bar projection includes a positioning member having a vertical surface for assuming a parallel contacting relationship with a portion of the surface of the vertical side of the slab for controlling the overhanging extent of said bar means with respect to said slab and assuring a desired operational contact between said vertical translating means and the vertical side of the slab.

3. The surface profile recording apparatus of claim 1 wherein said surface engaging means includes a tracking rod having as end portion positioned proximate to the surface, said tracking rod extending in a direction transverse to the vertical surface of the slab.

4. The surface profile recording apparatus of claim 2 further including a tracking roll positioned at an end portion of the tracking rod for engaging with the vertical surface of the slab.

5. The surface profile recording apparatus of claim 3 wherein said tracking rod further includes a means for exerting a force to maintain the end portion of the tracking rod in contact with the vertical surface of the slab.

6. The surface profile recording apparatus of claim 2 wherein said tracking rod slidably engages with a tracking rod bushing, said tracking rod bushing being mounted upon a tracking rod support plate for support thereby.

7. The surface profile recording apparatus of claim 6 herein said vertical translating means includes a vertical slide bushing mounted beneath said tracking rod support plate and a vertical slide rod slidably engaging with said vertical slide bushing for allowing vertical translation of the tracking rod support plate and the tracking rod positioned thereupon.

8. The surface profile recording apparatus of claim 7 wherein said recording means includes an ink dispensing means positioned at the end portion of the tracking rod and chart means positioned proximate thereto for recording the deflection of the tracking rod during translation of the tracking rod across the vertical surface of the slab.

9. A portable apparatus for determining an edge profile of a metal slab, including:
  a tracking rod having a first end portion for positioning said first end portion proximate to the metal slab with said tracking rod extending in a direction transverse to an edge surface of the slab;
  a tracking rod bushing and a tracking rod support plate, said tracking rod bushing being mounted upon the support plate and slidably engaging with the tracking rod to allow horizontal translation of the tracking rod;
  spring means positioned about a portion of the tracking rod along the length thereof for providing a spring force to maintain the end portion of the tracking rod proximate to the edge of the metal slab;
  a vertical slide bushing and a vertical slide rod slidably engaging therewith, said vertical slide bushing fixedly attached to the tracking support plate for allowing vertical translation of the tracking support plate and the tracking rod supported thereupon along the length of the vertical slide rod;
  support means for supporting the vertical slide rod;
  a positioning bar having an edge index protruding therefrom, said positioning bar extending from said support means in a direction parallel to the lengthwise direction of the tracking rod for allowing positioning of the positioning bar on a surface of the slab;
  ink dispensing means positioned at a second end portion of the tracking rod;
  chart means positioned beneath the ink dispensing means for recording deflection of the tracking rod as the tracking rod is translated across a vertical cross section of the edge surface of the slab thereby recording the edge profile of the slab; and
  handle means extending from the support means for allowing an operator to position the positioning bar on the metal slab.

10. An edge profile recording apparatus for determining an edge profile of a metallic workpiece, including:
  side engaging means for engaging with an edge surface of the workpiece,
  said side engaging means including a tracking rod having an end portion positioned proximate to the workpiece, said tracking rod extending in a direction transverse to the edge of the workpiece,
  said tracking rod slidably engaging with a tracking rod bushing, said tracking rod bushing being mounted upon a tracking rod support plate for support thereby,
  vertical translating means for translating the side engaging means across a vertical cross section of said edge surface,
  said vertical translating means includes a vertical slide bushing mounted beneath said tracking rod support plate and a vertical slide rod slidably engaging with said vertical slide bushing for allowing vertical translation of the tracking rod support plate and the tracking rod positioned thereupon,
  positioning means supported along a portion of the length thereof upon the top surface of the metallic workpiece to allow positioning of the vertical translation means at a known relationship relative to the metallic workpiece,
  said positioning means including a positioning bar extending from said support means in a direction parallel to the lengthwise direction of the tracking rod for allowing positioning of the positioning bar on the surface of a workpiece,
  recording means for recording deflection of said side engaging means as the side engaging means is translated across the vertical cross section of the edge surface, thereby recording the edge profile of the workpiece,
  said recording means includes an ink dispensing means positioned at the end portion of the tracking rod and a chart means positioned proximate thereto for recording the deflection of the tracking rod during translation of the tracking rod across the vertical cross section of the edge surface of the workpiece, and
  support means for supporting the vertical translating means and the chart means.

* * * * *